United States Patent Office 3,147,263
Patented Sept. 1, 1964

1

3,147,263
REDUCTION OF LINEAR-TRANS-QUINACRIDONE-QUINONE
Willy Braun, Heidelberg, Wilhelm Ruppel, Mannheim-Kaefertal, and Rolf Mecke, Ludwigshafen (Rhine) Gartenstadt, Germany, assignors to Badische Anilin- & Soda-Fabrik Aktiengesellschaft, Ludwigshafen (Rhine), Germany
No Drawing. Filed Apr. 4, 1961, Ser. No. 100,496
Claims priority, application, Germany, Apr. 8, 1960, B 57,403; Oct. 22, 1960, B 59,826; Nov. 10, 1960, B 60,034
7 Claims. (Cl. 260—279)

This invention relates to the reduction of linear-trans-quinacridone-quinone by the action of reducing metals. Furthermore, the invention relates to reduction products of linear-trans-quinacridone-quinone.

It is known from the literature, for example from Belgian patent specifications Nos. 560,543 and 568,930, that 7,14 - dioxo - 5,7,12,14 - tetrahydroquinolino-[2,3-b]-acridine (linear-trans-quinacridone can be used as a very fast and clear red pigment. This dye can be produced in various manners. It can be obtained, for example, by the processes described in Belgian patent specifications Nos. 560,542, 560,543 and 575,517 by condensation of a succinylosuccinic acid ester with aniline to form the 2,5-dianilino-3,6-dihydroterephthalic acid ester, ring closure of this ester to give dihydroquinacridone, and dehydrogenation of the latter compound according to the following scheme:

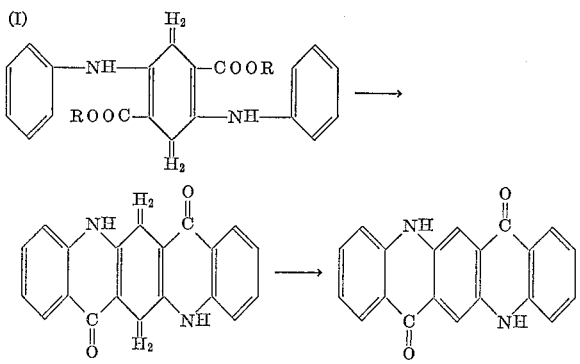

It is, however, also possible, as described by Libermann in "Annalen der Chemie," volume 518, 245 et seq. (1935), to first dehydrogenate the above-mentioned 2,5-dianilino-3,6 - dihydroterephthalic acid esters to give the 2,5-dianilinoterephthalic acid esters and then to convert the latter by ring closure, for example in the manner described in Belgian patent specifications Nos. 579,525 or 579,526, into the quinacridone according to the following scheme:

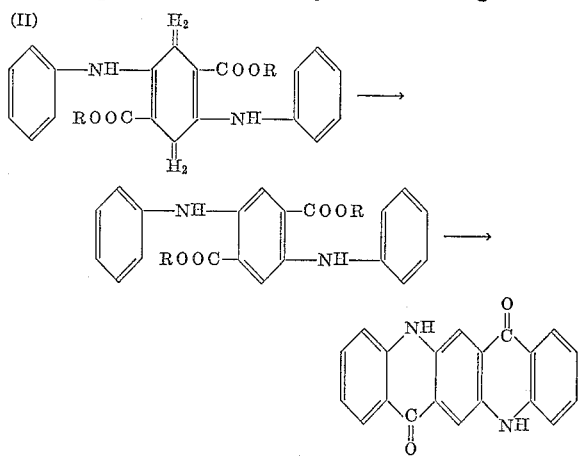

2

The above processes are, however, unsatisfactory because they are complicated and costly to carry out on an industrial scale.

It is an object of this invention to provide reduction products of linear-trans-quinacridone-quinone in a highly economical and practically useful manner. A more specific object of this invention is to provide 7,14-dioxo-5,7,12,14 - tetrahydroquinoline - [2,3-b] - acridine (linear-trans-quinacridone).

The objects of this invention are achieved by allowing a finely divided metal such as is usual as a reducing agent to act, in the presence of an aqueous-alcoholic alkali metal hydroxide solution or advantageously in the presence of fused anhydrous aluminum chloride or in the presence of a mineral acid, on linear-trans-quinacridone-quinone of the formula:

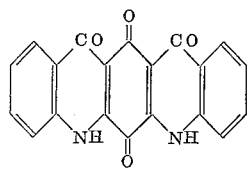

The new process proceeds according to the following scheme:

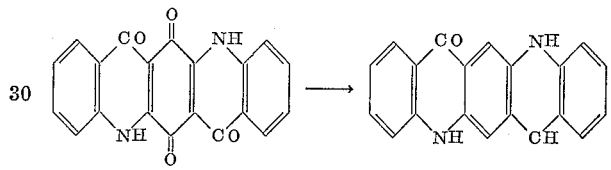

for example in the presence of an aqueous-alcoholic alkali metal hydroxide solution or in the presence of fused anhydrous aluminum chloride, at temperatures of between 70° and 260° C., within a period of from 20 minutes to 20 hours depending on the reaction conditions. If necessary, increased pressure is applied during the reaction. If it is desired to carry out the reduction at relatively high temperatures, the temperature range of from 80° to 220° C. is preferred. Whereas it is expedient to use reaction periods of from 10 to 20 hours when the reaction according to the invention is conducted in the presence of aqueous-alcoholic alkali metal hydroxide solutions, the reaction can advantageously be carried out within 20 to 60 minutes in the presence of fused anhydrous aluminum chloride. In general, longer reaction periods do not, however, have a deleterious effect.

If the reduction carried out in accordance with the present invention has passed beyond the stage of linear-trans-quinacridone, an aftertreatment with an oxidizing agent, preferably with a mild one, is required to obtain linear-transquinacridone.

Suitable aqueous-alcoholic alkali metal hydroxide solutions include solutions of sodium or potassium hydroxide or mixtures thereof in mixtures of water and one or more straight-chain or branched-chain alcohols, preferably low molecular weight alcohols such as methanol, ethanol or isopropanol. It is expedient to use aqueous-alcoholic alkali metal hydroxide solutions which contain, per 1000 parts of solution, 600 to 700 parts of water, 400 to 300 parts of alcohol and 40 to 60 parts of alkali metal hydroxide. As a rule, from 50 to 100 parts of quinacridone-quinone are used per 1000 parts of solution. The parts specified are by weight.

If anhydrous aluminum chloride is employed, it is expedient to add thereto the usual melting-point depressing substances, for example the compounds specified in German patent specification No. 878,647, such as preferably sodium formate or urea, or inorganic salts, such as sodium chloride, potassium chloride, potassium fluoride or mixtures thereof. The aluminum chloride melt advantageously contains 10 to 15 or even 20 parts by weight of one or more melting-point depressing substances per 100 parts by weight of anhydrous aluminum chloride. As a rule, 10 to 15 parts by weight of quinacridone-quinone are used per 100 parts by weight of melt. With the said melting-point depressing substances used in amounts as specified above, the lower limit of the temperature range within which reduction takes place is usually about 70° C. If, however, acetamide, advantageously in amounts of about 10 to 15 parts by weight per 100 parts by weight of aluminum chloride, or larger amounts of urea, dimethylformamide or sodium formate, preferably more than 20 parts by weight per 100 parts of aluminum chloride, are used as melting-point depressing substances, the reduction temperature can be less than 70° C., for example 55°, 50°, 45°, 40°, or 30° to 35° C. By conducting the process at relatively low temperatures, corrosion of the apparatus is reduced, the yields are increased and a purer end product can be obtained.

As a rule, 3 to 3.5 moles of finely divided metal are required per mole of quinacridone-quinone.

Suitable mineral acids in the presence of which the finely divided metal may be used include aqueous hydrochloric acid, sulfuric acid and phosphoric acid. In general, highly concentrated acids, for example about 70% sulfuric acid, about 70% phosphoric acid or about 2 N hydrochloric acid, are used. Higher concentrations are, however, also suitable. When the process is carried out in the presence of mineral acids, the reduction temperatures may be very low, for example 0° C., but may of course also lie higher, for example in the range of between 0° and 100° C. or above 100° C., e.g., up to 120° C. It is expedient to use 100 to 300 parts of mineral acid per 10 parts of linear-trans-quinacridone-quinone. The reducing agent is, as a rule, employed in an amount calculated to reduce the linear-trans-quinacridone-quinone to the desired stage. If necessary, the reducing agent may be used in excess for example up to about 20%. In general, the reaction is complete after 1 to 30 hours.

Metals which are commonly used in finely divided form as reducing agents and which are suitable for the process according to this invention include iron, copper, aluminum, nickel and, preferably, zinc, as well as mixtures of these metals. The finely divided metals may be employed in the form of, for example, powders, granules, dust, chips, borings or splinters.

When the process according to the invention is conducted in the presence of mineral acids, iron, copper, aluminum and especially zinc, are to be preferred as reducing metals. By this method, quinacridone or the product preparable by reducing quinacridone-quinone one stage further, viz. dihydroquinacridone, can be obtained direct.

In carrying out the process according to the present invention and in working up the reaction mixtures, various methods may be adopted. The procedure may, for example, be as follows:

The reaction product obtained in aqueous-alcoholic alkali hydroxide solution is separated by suction filtration. Then the excess metal is removed by boiling with dilute hydrochloric acid, the filtered material washed free from acid and subjected to the action of mild oxidizing agents, such as the sodium salt of m-nitrobenzenesulfonic acid, sodium polysulfite, atmospheric oxygen or pure oxygen in alcoholic-alkaline solution, small admixtures of dihydroquinacridone being dehydrogenated to quinacridone during this operation.

When the process according to this invention is carried out in fused anhydrous aluminum chloride, the melt is decomposed by pouring it onto ice water and boiling it up. Then the reaction product is filtered off, boiled with dilute hydrochloric acid and washed free from acid. In this case, an oxidizing aftertreatment is in general not required.

Surprisingly, by the process according to the invention linear-trans-quinacridone-quinone is reduced by finely divided metals such as are usual as reducing agents, not only to the corresponding hydroquinone, as is the case with other derivatives of p-benzoquinone, but the reduction proceeds further to the stage of benzene without the acridone rings undergoing any change. This could not be foreseen because it is known that p-benzoquinone in catalytic hydrogenation affords benzene only at temperatures as high as 220° C., whereas linear-trans-quinacridone-quinone under the same conditions is reduced only to the hydroquinone stage.

Reduction in the presence of mineral acids may, for example, be carried out as follows:

Zinc dust or iron powder is allowed to act, at temperatures of between 0° and 100° C., on a suspension of quinacridone-quinone in 70% sulfuric acid, linear-trans-quinacridone being obtained in good yield. If, in the presence of an excess of reducing agent, the temperature is raised to above 150° C. and the concentration of the sulfuric acid is increased to such a degree that the quinacridonequinone is dissolved (for example to 80 to 90%), dihydroquinacridone is formed. This compound can be converted into quinacridone by mild oxidizing agents. Suitable oxidizing agents of this kind include sodium m-nitrobenzene sulfonate, sodium polysulfite, atmospheric oxygen or pure oxygen in alcoholic-alkaline solution or ferric sulfate in the presence of acids.

Quinacridone can, however, also be obtained direct at temperatures of between 100° and 140° C. and after short reaction periods by using sulfuric acid of lower concentration (about 70 to 75%) which just dissolves the quinacridone-quinone at the prevailing reaction temperature, but dissolves no quinacridone or only negligible amounts thereof.

If copper powder is allowed to act, at temperatures of above 100° C., on a solution of quinacridone-quinone in sulfuric acid having a concentration of more than 70% up to about 85%, a new violet compound is obtained in very good yields. This compound has also very good pigment properties.

The products which are obtained when the reduction process is carried out in the presence of mineral acids are separated, if required after diluting the reaction mixture with water, in the usual manner, washed free from acid with water, and dried.

The starting material, linear-trans-quinacridone-quinone, can be obtained in a simple manner by condensation of 1 mole of p-benzoquinone with 2 moles of o-aminobenzoic acid and ring closure of the resultant compounds according to the method described in "Berichte der Deutschen Chemischen Gesellschaft," 51, 701 et seq. (1916). The quinacridone-quinone used as starting material for reduction in the presence of mineral acids need not be present in isolated form. Thus, quinacridone-quinone prepared by heating 2,5-dianthranilobenzoquinone in sulfuric acid can be reduced direct, in the condensation melt, to form linear-trans-quinacridone. The process according to the present invention is, however, not only suitable for the reduction of quinacridone-quinone itself, but also for the reduction of its derivatives. The 3,9-halogen and alkyl derivatives, for example, may likewise be used for the new reduction process.

The invention will be further illustrated by, but is not limited to, the following examples. The parts and percentages specified in the examples are by weight.

*Example 1*

25 parts of linear-trans-quinacridone-quinone are stirred together with 30 parts of zinc dust in a mixture of 250 parts of water, 100 parts of methanol and 15 parts of sodium hydroxide in a pressure vessel for 20 hours at 200° C. The reaction product is filtered off by suction, the excess zinc removed by boiling with dilute hydrochloric acid, and the filtered material washed free from acid. The material is then aftertreated in the usual manner, in aqueous-alcoholic liquid, with the sodium salt of m-nitrobenzenesulfonic acid. The linear-trans-quinacridone is then liberated from the alkali compound by adding acid, and 7,14-dioxo-5,7,12,14-tetrahydroquinolino-[2,3-b]-acridine is thus obtained in the form of a claret-red powder. The yield is 17 parts (74.5% of the theoretical amount).

The aftertreatment may also be carried out with sodium polysulfite or oxygen instead of with sodium m-nitrobenzenesulfonate.

Example 2

10 parts of linear-trans-quinacridone-quinone are dissolved at 60° to 70° C. in a melt of 100 parts of anhydrous aluminum chloride and 20 parts of urea. 10 parts of zinc dust are then introduced at about 80° C., while stirring. The reaction mixture is maintained at 80° to 85° C. for about half an hour to one hour, and then allowed to cool. The melt is decomposed by pouring it into ice water and boiling it up. The claret-red reaction product is filtered off and boiled with dilute hydrochloric acid. The dye thus obtained dissolves in concentrated sulfuric acid giving a red color, and in alcoholic potassium hydroxide solution giving a blue color. The yield is 9 parts (99% of the theoretical amount).

Example 3

10 parts of linear-trans-quinacridone-quinone are dissolved at 60° C. in a fused mixture of 100 parts of anhydrous aluminum chloride, 10 parts of sodium chloride and 5 parts of potassium chloride. Then 10 parts of copper powder are introduced into the mixture, while stirring. The temperature of the reaction mixture is raised to 70° to 80° C., and the mixture stirred for one hour at this temperature. The melt is allowed to cool, and then worked up as described in Example 2. 7,14-dioxo-5,7,12,14-tetrahydroquinolino - [2,3-b] - acridine is thus obtained in a yield of 94% of the theoretical amount.

Example 4

25 parts of linear-trans-quinacridone-quinone are dissolved at 80° C. in a melt of 300 parts of anhydrous aluminum chloride and 40 parts of sodium formate. The melt is then stirred with 25 parts of zinc dust. The temperature is raised to 100° C. and the melt maintained at this temperature for about half an hour. The melt is then decomposed and worked up as described in Example 2. About 22 parts (96% of the theoretical amount) of pure 7,14-dioxo-5,7,12,14-tetrahydroquinolino-[2,3-b]-acridine are obtained in the form of a bluish-red powder.

Example 5

15 parts of linear-trans-quinacridone-quinone are dissolved at 40° C. in a melt of 200 parts of aluminum chloride and 30 parts of acetamide, while stirring well. Then 12 parts of zinc dust are introduced. Stirring of the mixture is continued for about 2 to 3 hours at 40° to 45° C. The melt is then decomposed by pouring it into ice water and boiling it up while adding a small amount of hydrochloric acid. The claret-colored reaction product is filtered off and freed from aluminum salts by boiling it with dilute hydrochloric acid. The crude quinacridone which is obtained in a yield of 12.6 parts (92% of the theoretical amount) can, if desired, be purified by fractional precipitation from a solution in concentrated sulfuric acid.

Example 6

7.5 parts of linear-trans-quinacridone-quinone are dissolved at 40° to 45° C. in a melt of 100 parts of aluminum chloride and 20 parts of urea, and 6 parts of zinc dust are added. The further procedure is the same as described in Example 5. After a reaction period of 4 to 5 hours and after working up as described in Example 5, about 6.7 parts of quinacridone are obtained. This is an almost quantitative yield.

Example 7

10 parts of linear-trans-quinacridone-quinone are dissolved at 40° to 45° C. in a melt of 200 parts of aluminum chloride and 30 parts of acetamide. 12.7 parts of zinc dust (90%; equal to 200% of the theoretical amount) are stirred in, and the whole is maintained at 40° to 45° C. for 2 hours, while stirring well. After working up as described in Example 5, about 8.7 parts of quinacridone (95% of the theoretical amount) are obtained.

Example 8

12.5 parts of linear-trans-quinacridone-quinone are dissolved at 45° to 50° C. in a melt of 200 parts of aluminum chloride and 50 parts of urea. Then 19 parts of zinc dust are introduced, and the whole is stirred for 4 hours at 50° to 55° C. After working up as described in Example 5, dihydroquinacridone is obtained in an excellent yield. This compound can be converted into linear-trans-quinacridone by oxidation as described in Example 1.

Example 9

10 parts of zinc dust are introduced at 5 to 10° C., while stirring well, into a suspension of 10 parts of linear-trans-quinacridone-quinone in 200 parts of 70% sulfuric acid. The whole is stirred for about 20 hours at room temperature. Then the reaction mixture is slowly heated to 95° to 100° C., and stirring is continued for some hours. After filtration, the residue is freed from excess zinc by boiling it with dilute hydrochloric acid. From the resultant crude product, pure linear-trans-quinacridone is obtained by fractional precipitation from sulfuric acid solution.

Example 10

7 parts of zinc dust are introduced in the course of 30 minutes at 120° C., while stirring, into a solution of 10 parts of quinacridone-quinone in 130 parts of 72% sulfuric acid. The temperature is raised to 140° C. in the course of one hour and the whole stirred for 1½ hours at this temperature. The reaction mixture is then cooled and filtrated by suction. The residue is dissolved in 200 parts of 96% sulfuric acid, filtered off from zinc dust and zinc sulfate, and fractionated with about 40 parts of water. Pure linear-trans-quinacridone is obtained in a yield of about 80% of the theoretical amount.

By dilution with water, a further quantity of pure linear-trans-quinacridone is obtained from the filtrate of the reaction solution.

Example 11

By following the procedure described in Example 10, but using the equivalent amount of iron powder instead of zinc dust, pure linear-trans-quinacridone is obtained in a similarly good yield.

Example 12

10.2 parts of copper powder are introduced into a suspension of 27.4 parts of linear-trans-quinacridone-quinone in 280 parts of 70% sulfuric acid. The reaction mixture is heated at 130° C. for 2 to 3 hours and then allowed to cool. The deposited red-violet crystals are filtered off by suction. After dissolving out the excess copper with dilute hydrochloric acid, 20 parts of a product are obtained in the form of red-violet crystals. The product dissolves in concentrated sulfuric acid giving a yellow color and forms a brown-black, difficultly soluble alkali salt. Another 2 to 3 parts of the compound can be recovered from the filtrate by the addition of water.

Example 13

20 parts of zinc dust are introduced, at 100° C., into a solution of 10 parts of linear-trans-quinacridone in 200 parts of 85% sulfuric acid. The whole is heated to 140° to 150° C. in the course of several hours and maintained at this temperature until starting material can no longer be detected. After cooling, the reaction mixture is poured into ice water, the precipitate filtered off, and the residue freed from zinc by boiling it with dilute mineral acid. The blue-red product yields pure linear-trans-quinacridone on dehydrogenation with mild oxidizing agents, for example on dehydrogenation in alcoholic alkali with sodium m-nitrobenzenesulfonate or in dilute mineral acid with ferric sulfate.

*Example 14*

A solution of 10 parts of 2,5-dianthranilobenzoquinone-1,4 in 94 parts of 96% sulfuric acid is heated to 170° to 180° C., while stirring. Stirring is continued at this temperature for 30 minutes, and the solution then cooled rapidly to 100° C. 33 parts of water are dripped in slowly, the temperature rising to 120° C. Then 10 parts of zinc dust are added in the course of 30 minutes, and the temperature is raised to 140° C. in the course of one hour. The reaction mixture is stirred for 1½ hours at this temperature, cooled to room temperature, and worked up as descibed in Example 10. Pure linear-trans-quinacridone is obtained in a yield of about 70% of the theoretical amount.

As can ben seen from the foregoing detailed description and examples, the invention relates to an advantageous process for the production of reduction products of linear-trans-quinacridone-quinone. More specifically, it relates to the production of linear-trans-quinacridone by means of reducing metals which are suitable for use on an industrial scale and which have a reducing action in the presence of aqueous-alcoholic alkali hydroxide solutions, fused aluminum chloride or mineral acids at temperatures in the range of between about 0° and 260° C. Whereas iron, zinc, copper and aluminum are preferred as metals of the said kind, mixtures thereof and similar reducing metals are also suitable.

The reaction medium in which the reduction of linear-trans-quinacridone-quinone is to be carried out should be strong enough to provide, together with the metal, sufficient reducing action. Whereas aqueous-alcoholic alkali metal hydroxide solutions and strong mineral acids are liquid already at ordinary temperatures, anhydrous aluminum chloride must be fused with or without the addition of substances depressing its melting point.

Upon knowledge of the present disclosure, it is within the skill of those familiar with chemistry to make use of the process of the present invention and of analogous methods without deviating from the scope of the invention.

We claim:

1. A process for the reduction of linear-trans-quinacridone-quinone which comprises reacting said linear-trans-quinacridone-quinone at a temperature of about 30° C. to 260° C. with a reducing agent consisting essentially of a finely divided metal selected from the group consisting of zinc, iron, copper, aluminum, nickel and mixtures thereof in a liquid reaction medium consisting essentially of fused aluminum chloride.

2. A process as claimed in claim 2 wherein said liquid reaction medium contains a melting point depressant for said aluminum chloride.

3. A process for the reduction of linear-trans-quinacridone-quinone which comprises reacting said linear-trans-quinacridone-quinone with a finely divided metal reducing agent selected from the group consisting of iron, copper, zinc, aluminum, nickel and mixtures thereof in a liquid medium consisting essentially of fused aluminum chloride.

4. A process as claimed in claim 3 wherein the liquid medium is a melt of aluminum chloride and a melting-point depressant for said aluminum chloride.

5. A process as claimed in claim 4 wherein the melting-point depressant is a compound selected from the group consisting of acetamide, urea, dimethylformamide and sodium formate.

6. A process as claimed in claim 4 wherein 10 to 15 parts by weight of acetamide are used as a melting-point depressant per 100 parts by weight of aluminum chloride.

7. A process as claimed in claim 4 wherein more than 20 parts by weight of a melting-point depressant selected from the group consisting of urea, dimethylformamide and sodium formate are used per 100 parts by weight of aluminum chloride.

References Cited in the file of this patent

Lesnianski: Berichte der deutsche chemische Gesellschaft, vol. 51, pages 695–706, page 705 relied on (1918).

UNITED STATES PATENT OFFICE
CERTIFICATE OF CORRECTION

Patent No. 3,147,263            September 1, 1964

Willy Braun et al.

It is hereby certified that error appears in the above numbered patent requiring correction and that the said Letters Patent should read as corrected below.

Column 2, lines 26 to 33, for that portion of the formula reading $\diagdown_{CH}\diagup$ read $\diagdown_{CO}\diagup$ column 6, line 72, for "linear-trans-quinacridone" read -- linear-trans-quinacridone-quinone --.

Signed and sealed this 19th day of January 1965.

(SEAL)
Attest:

ERNEST W. SWIDER            EDWARD J. BRENNER
Attesting Officer            Commissioner of Patents